United States Patent
Gupta

(10) Patent No.: US 10,972,566 B2
(45) Date of Patent: *Apr. 6, 2021

(54) SYSTEMS AND METHODS FOR ELECTRONIC NOTIFICATION BROADCASTS

(71) Applicant: salesforce.com, inc., San Francisco, CA (US)

(72) Inventor: Amool Gupta, Berkeley, CA (US)

(73) Assignee: salesforce.com, inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/776,705

(22) Filed: Jan. 30, 2020

(65) Prior Publication Data

US 2020/0169617 A1    May 28, 2020

Related U.S. Application Data

(63) Continuation of application No. 15/477,396, filed on Apr. 3, 2017, now Pat. No. 10,594,815.

(51) Int. Cl.
*G06F 15/173* (2006.01)
*H04L 29/08* (2006.01)

(52) U.S. Cl.
CPC .............. *H04L 67/26* (2013.01); *H04L 67/18* (2013.01); *H04L 67/22* (2013.01)

(58) Field of Classification Search
CPC ..... H04L 67/26; H04L 12/1859; H04L 29/08; H04L 67/18; H04L 67/22; H04W 4/02; G06F 16/9537
See application file for complete search history.

(56) References Cited

U.S. PATENT DOCUMENTS

| | | | |
|---|---|---|---|
| 5,577,188 | A | 11/1996 | Zhu |
| 5,608,872 | A | 3/1997 | Schwartz et al. |
| 5,649,104 | A | 7/1997 | Carleton et al. |
| 5,715,450 | A | 2/1998 | Ambrose et al. |
| 5,761,419 | A | 6/1998 | Schwartz et al. |
| 5,819,038 | A | 10/1998 | Carleton et al. |
| 5,821,937 | A | 10/1998 | Tonelli et al. |
| 5,831,610 | A | 11/1998 | Tonelli et al. |
| 5,873,096 | A | 2/1999 | Lim et al. |
| 5,918,159 | A | 6/1999 | Fomukong et al. |
| 5,963,953 | A | 10/1999 | Cram et al. |
| 6,092,083 | A | 7/2000 | Brodersen et al. |
| 6,161,149 | A | 12/2000 | Achacoso et al. |
| 6,169,534 | B1 | 1/2001 | Raffel et al. |
| 6,178,425 | B1 | 1/2001 | Brodersen et al. |
| 6,189,011 | B1 | 2/2001 | Lim et al. |
| 6,216,135 | B1 | 4/2001 | Brodersen et al. |
| 6,233,617 | B1 | 5/2001 | Rothwein et al. |
| 6,266,669 | B1 | 7/2001 | Brodersen et al. |
| 6,295,530 | B1 | 9/2001 | Ritchie et al. |
| 6,324,568 | B1 | 11/2001 | Diec et al. |

(Continued)

*Primary Examiner* — Cheikh T Ndiaye
(74) *Attorney, Agent, or Firm* — LKGlobal | Lorenz & Kopf, LLP

(57) ABSTRACT

Systems and methods are disclosed for managing displays of notifications to a user device. A method can include determining that an event has occurred that requires a user notification. One or more user and device characteristics are analyzed to determine whether a user notification is to be displayed on the user device.

20 Claims, 7 Drawing Sheets

(56) References Cited

U.S. PATENT DOCUMENTS

| | | |
|---|---|---|
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,062,502 B1 | 6/2006 | Kesler |
| 7,069,231 B1 | 6/2006 | Cinarkaya et al. |
| 7,181,758 B1 | 2/2007 | Chan |
| 7,289,976 B2 | 10/2007 | Kihneman et al. |
| 7,340,411 B2 | 3/2008 | Cook |
| 7,356,482 B2 | 4/2008 | Frankland et al. |
| 7,401,094 B1 | 7/2008 | Kesler |
| 7,412,455 B2 | 8/2008 | Dillon |
| 7,508,789 B2 | 3/2009 | Chan |
| 7,620,655 B2 | 11/2009 | Larsson et al. |
| 7,698,160 B2 | 4/2010 | Beaven et al. |
| 7,730,478 B2 | 6/2010 | Weissman |
| 7,779,475 B2 | 8/2010 | Jakobson et al. |
| 8,014,943 B2 | 9/2011 | Jakobson |
| 8,015,495 B2 | 9/2011 | Achacoso et al. |
| 8,032,297 B2 | 10/2011 | Jakobson |
| 8,082,301 B2 | 12/2011 | Ahlgren et al. |
| 8,095,413 B1 | 1/2012 | Beaven |
| 8,095,594 B2 | 1/2012 | Beaven et al. |
| 8,209,308 B2 | 6/2012 | Rueben et al. |
| 8,275,836 B2 | 9/2012 | Beaven et al. |
| 8,457,545 B2 | 6/2013 | Chan |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 8,823,507 B1 * | 9/2014 | Touloumtzis .......... G08B 23/00 340/501 |
| 2001/0044791 A1 | 11/2001 | Richter et al. |
| 2002/0072951 A1 | 6/2002 | Lee et al. |
| 2002/0082892 A1 | 6/2002 | Raffel |
| 2002/0129352 A1 | 9/2002 | Brodersen et al. |
| 2002/0140731 A1 | 10/2002 | Subramanian et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2006/0021019 A1 | 1/2006 | Hinton et al. |
| 2008/0249972 A1 | 10/2008 | Dillon |
| 2009/0063414 A1 | 3/2009 | White et al. |
| 2009/0100342 A1 | 4/2009 | Jakobson |
| 2009/0177744 A1 | 7/2009 | Marlow et al. |
| 2011/0247051 A1 | 10/2011 | Bulumulla et al. |
| 2012/0042218 A1 | 2/2012 | Cinarkaya et al. |
| 2012/0218958 A1 | 8/2012 | Rangaiah |
| 2012/0233137 A1 | 9/2012 | Jakobson et al. |
| 2013/0212497 A1 | 8/2013 | Zelenko et al. |
| 2013/0218948 A1 | 8/2013 | Jakobson |
| 2013/0218949 A1 | 8/2013 | Jakobson |
| 2013/0218966 A1 | 8/2013 | Jakobson |
| 2013/0247216 A1 | 9/2013 | Cinarkaya et al. |
| 2013/0325922 A1 * | 12/2013 | Chaudhri .............. G06Q 10/10 709/203 |
| 2014/0006769 A1 * | 1/2014 | Chory .................. G06F 1/3203 713/100 |
| 2015/0281985 A1 * | 10/2015 | Cavallaro ........... H04M 1/7253 455/41.2 |
| 2015/0350146 A1 * | 12/2015 | Cary .................. H04L 67/2823 709/206 |
| 2017/0099592 A1 * | 4/2017 | Loeb .................. G06Q 10/107 |

* cited by examiner

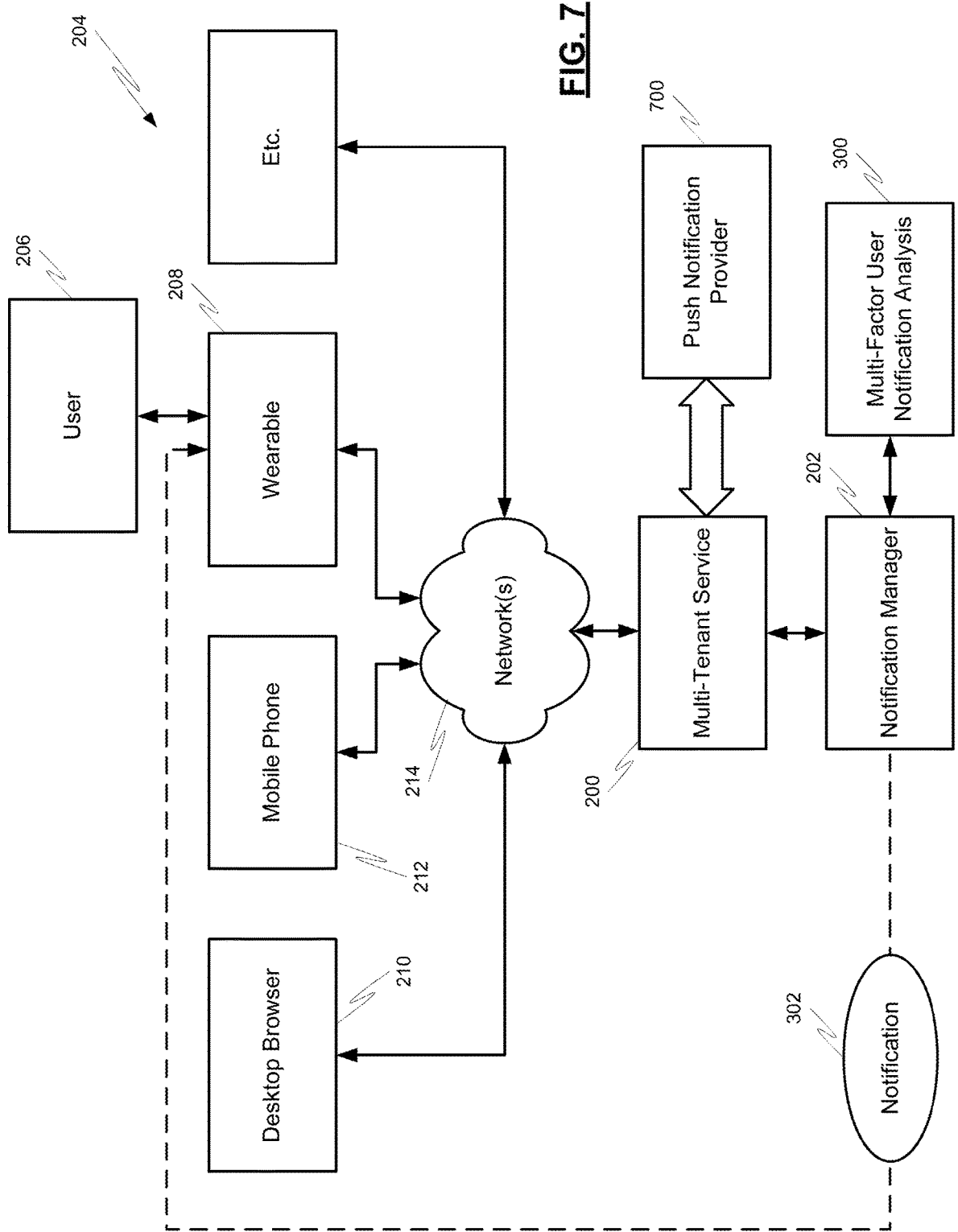

US 10,972,566 B2

SYSTEMS AND METHODS FOR ELECTRONIC NOTIFICATION BROADCASTS

CROSS-REFERENCE TO RELATED APPLICATIONS

This application is a continuation of U.S. patent application Ser. No. 15/477,396, filed Apr. 3, 2017, the entire content of which is incorporated by reference herein.

TECHNICAL FIELD

This disclosure relates to broadcasting electronic notifications and more particularly to processor-implemented systems and methods for electronic notification broadcasts within a multi-device environment.

BACKGROUND

A service or website typically supports multiple platforms such as desktop browsers, mobile phone applications, wearables, gaming systems, etc. When an electronic notification is issued by such a system, it is often pushed to all or more than one platform, and a user receives simultaneous notifications on the user's phone, desktop, wearable, television, gaming console, etc. This typically results in a barrage of notifications through these different devices which can cause confusion to the user as well as resulting in many additional user interactions with these devices in order to address all of the notifications.

As an illustration, when an email arrives, a user's mobile device, wearable, desktop, and tablet may all buzz simultaneously. The user attends to the notification on one device but residual notifications are left on other platforms which the user has to clear at a later time. At that later time, the user may be unsure as to whether a notification appearing on a device has already been addressed. This is especially problematic if the user is accessing other devices several days after handling the notification on a different device.

BRIEF DESCRIPTION OF THE DRAWINGS

The present invention will be understood more fully from the detailed description given below and from the accompanying drawings of various embodiments of the present invention, which, however, should not be taken to limit the present invention to the specific embodiments, but are for explanation and understanding only.

FIG. 7 is a block diagram depicting a source of user notifications for delivery to a user device.

DETAILED DESCRIPTION

The subject matter described herein discloses apparatuses, systems, techniques, and articles that manage electronic notifications, such as for notifications within a multi-device user environment. In some examples, apparatuses, systems, techniques, and articles disclosed herein use multiple factors to determine which of the devices to send an electronic notification. In some examples, systems and methods disclosed herein utilize user context, user liveliness, and geo-location characteristics associated with the user devices for transmitting user notifications to only a single user device and to stop notifications to all other devices.

Figure 1:
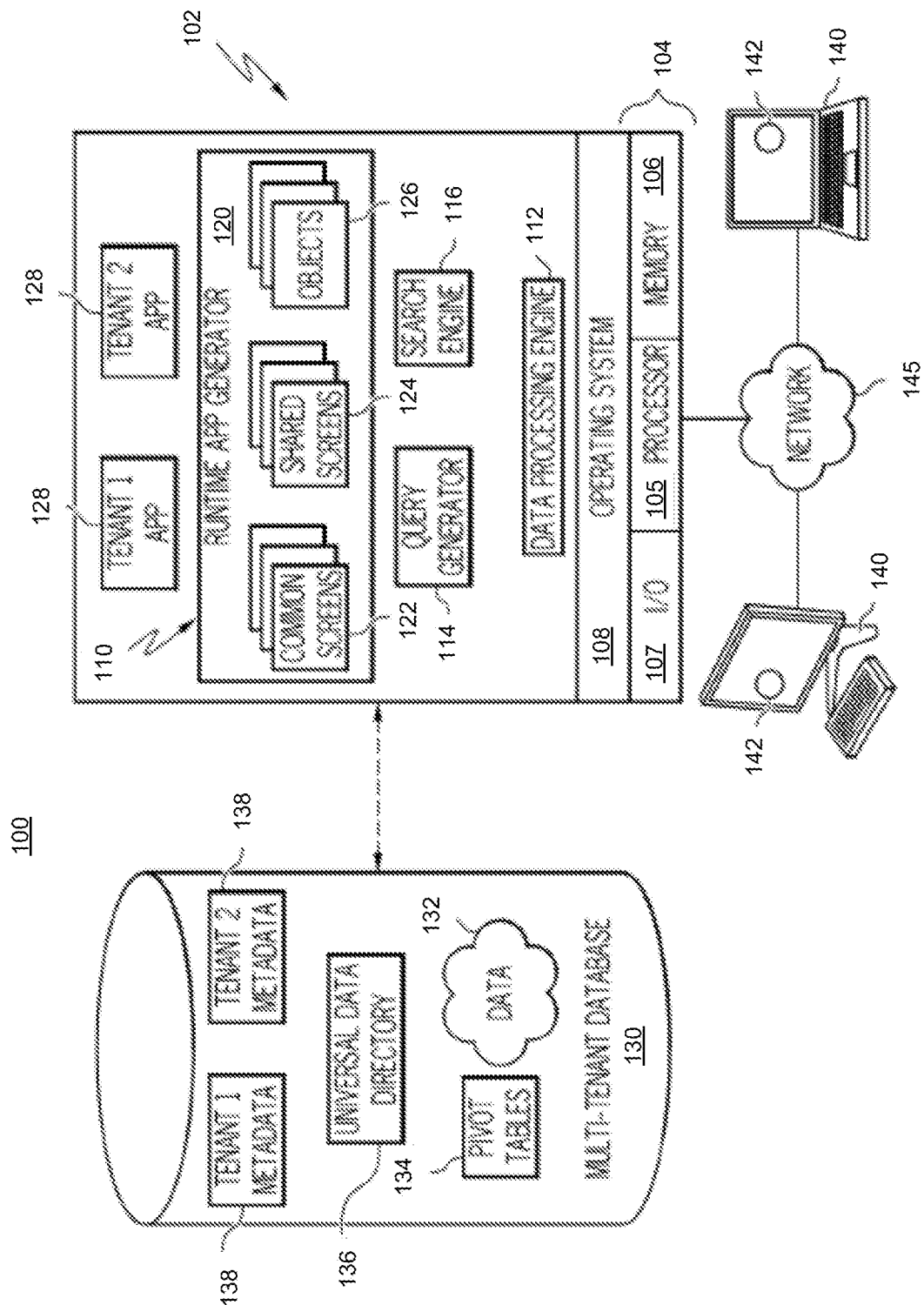
FIG. 1 is a block diagram depicting an exemplary embodiment of an on-demand multi-tenant database system.

FIG. 1 and the following discussion are intended to provide a brief, general description of one non-limiting example of an example environment in which the embodiments described herein may be implemented. Those of ordinary skill in the art will appreciate that the embodiments described herein may be practiced with other computing environments.

FIG. 1 depicts an exemplary embodiment of an on-demand multi-tenant database system 100. The illustrated multi-tenant system 100 of FIG. 1 includes a server 102 that dynamically creates and supports virtual applications 128 based upon data 132 from a common database 130 that is shared between multiple tenants, alternatively referred to herein as a multi-tenant database. Data and services generated by the virtual applications 128 are provided via a network 145 to any number of client devices 140, as desired. Each virtual application 128 is suitably generated at runtime (or on-demand) using a common application platform 110 that securely provides access to the data 132 in the database 130 for each of the various tenants subscribing to the multi-tenant system 100. In accordance with one non-limiting example, the multi-tenant system 100 is implemented in the form of an on-demand multi-tenant customer relationship management (CRM) system that can support any number of authenticated users of multiple tenants.

As used herein, a "tenant" or an "organization" should be understood as referring to a group of one or more users or entities that shares access to common subset of the data within the multi-tenant database 130. In this regard, each tenant includes one or more users associated with, assigned to, or otherwise belonging to that respective tenant. To put it another way, each respective user within the multi-tenant system 100 is associated with, assigned to, or otherwise belongs to a particular tenant of the plurality of tenants supported by the multi-tenant system 100. Tenants may represent customers, customer departments, business or legal organizations, and/or any other entities that maintain data for particular sets of users within the multi-tenant system 100 (i.e., in the multi-tenant database 130). For example, the application server 102 may be associated with one or more tenants supported by the multi-tenant system 100. Although multiple tenants may share access to the server 102 and the database 130, the particular data and services provided from the server 102 to each tenant can be securely isolated from those provided to other tenants (e.g., by restricting other tenants from accessing a particular tenant's data using that tenant's unique organization identifier as a filtering criterion). The multi-tenant architecture therefore allows different sets of users to share functionality and hardware resources without necessarily sharing any of the data 132 belonging to or otherwise associated with other tenants.

The multi-tenant database 130 is any sort of repository or other data storage system capable of storing and managing the data 132 associated with any number of tenants. The database 130 may be implemented using any type of conventional database server hardware. In various embodiments, the database 130 shares processing hardware 104 with the server 102. In other embodiments, the database 130 is implemented using separate physical and/or virtual database server hardware that communicates with the server 102 to perform the various functions described herein. In an exemplary embodiment, the database 130 includes a database management system or other equivalent software capable of determining an optimal query plan for retrieving and providing a particular subset of the data 132 to an instance of virtual application 128 in response to a query initiated or otherwise provided by a virtual application 128. The multi-tenant database 130 may alternatively be referred to herein as an on-demand database, in that the multi-tenant database 130 provides (or is available to provide) data at run-time to on-demand virtual applications 128 generated by the application platform 110.

In practice, the data 132 may be organized and formatted in any manner to support the application platform 110. In various embodiments, the data 132 is suitably organized into a relatively small number of large data tables to maintain a semi-amorphous "heap"-type format. The data 132 can then be organized as needed for a particular virtual application 128. In various embodiments, conventional data relationships are established using any number of pivot tables 134 that establish indexing, uniqueness, relationships between entities, and/or other aspects of conventional database organization as desired. Further data manipulation and report formatting is generally performed at run-time using a variety of metadata constructs. Metadata within a universal data directory (UDD) 136, for example, can be used to describe any number of forms, reports, workflows, user access privileges, business logic and other constructs that are common to multiple tenants. Tenant-specific formatting, functions and other constructs may be maintained as tenant-specific metadata 138 for each tenant, as desired. Rather than forcing the data 132 into an inflexible global structure that is common to all tenants and applications, the database 130 is organized to be relatively amorphous, with the pivot tables 134 and the metadata 138 providing additional structure on an as-needed basis. To that end, the application platform 110 suitably uses the pivot tables 134 and/or the metadata 138 to generate "virtual" components of the virtual applications 128 to logically obtain, process, and present the relatively amorphous data 132 from the database 130.

The server 102 is implemented using one or more actual and/or virtual computing systems that collectively provide the dynamic application platform 110 for generating the virtual applications 128. For example, the server 102 may be implemented using a cluster of actual and/or virtual servers operating in conjunction with each other, typically in association with conventional network communications, cluster management, load balancing and other features as appropriate. The server 102 operates with any sort of conventional processing hardware 104, such as a processor 105, memory 106, input/output features 107 and the like. The input/output features 107 generally represent the interface(s) to networks (e.g., to the network 145, or any other local area, wide area or other network), mass storage, display devices, data entry devices and/or the like. The processor 105 may be implemented using any suitable processing system, such as one or more processors, controllers, microprocessors, microcontrollers, processing cores and/or other computing resources spread across any number of distributed or integrated systems, including any number of "cloud-based" or other virtual systems. The memory 106 represents any non-transitory short or long term storage or other computer-readable media capable of storing programming instructions for execution on the processor 105, including any sort of random access memory (RAM), read only memory (ROM), flash memory, magnetic or optical mass storage, and/or the like. The computer-executable programming instructions, when read and executed by the server 102 and/or processor 105, cause the server 102 and/or processor 105 to create, generate, or otherwise facilitate the application platform 110 and/or virtual applications 128 and perform one or more additional tasks, operations, functions, and/or processes described herein. It should be noted that the memory 106 represents one suitable implementation of such computer-readable media, and alternatively or additionally, the server 102 could receive and cooperate with external computer-readable media that is realized as a portable or mobile component or application platform, e.g., a portable hard drive, a USB flash drive, an optical disc, or the like.

The application platform 110 is any sort of software application or other data processing engine that generates the virtual applications 128 that provide data and/or services to the client devices 140. In a typical embodiment, the application platform 110 gains access to processing resources, communications interfaces and other features of the processing hardware 104 using any sort of conventional or proprietary operating system 108. The virtual applications 128 are typically generated at run-time in response to input received from the client devices 140. For the illustrated embodiment, the application platform 110 includes a bulk data processing engine 112, a query generator 114, a search engine 116 that provides text indexing and other search functionality, and a runtime application generator 120. Each of these features may be implemented as a separate process or other module, and many equivalent embodiments could include different and/or additional features, components or other modules as desired.

The runtime application generator 120 dynamically builds and executes the virtual applications 128 in response to specific requests received from the client devices 140. The virtual applications 128 are typically constructed in accordance with the tenant-specific metadata 138, which describes the particular tables, reports, interfaces and/or other features of the particular application 128. In various embodiments, each virtual application 128 generates dynamic web content that can be served to a browser or other client program 142 associated with its client device 140, as appropriate.

The runtime application generator 120 suitably interacts with the query generator 114 to efficiently obtain multi-tenant data 132 from the database 130 as needed in response to input queries initiated or otherwise provided by users of the client devices 140. In a typical embodiment, the query generator 114 considers the identity of the user requesting a particular function (along with the user's associated tenant), and then builds and executes queries to the database 130 using system-wide metadata 136, tenant specific metadata 138, pivot tables 134, and/or any other available resources. The query generator 114 in this example therefore maintains security of the common database 130 by ensuring that queries are consistent with access privileges granted to the user and/or tenant that initiated the request. In this manner, the query generator 114 suitably obtains requested subsets of data 132 accessible to a user and/or tenant from the database 130 as needed to populate the tables, reports or other features of the particular virtual application 128 for that user and/or tenant.

Still referring to FIG. 1, the data processing engine 112 performs bulk processing operations on the data 132 such as uploads or downloads, updates, online transaction processing, and/or the like. In many embodiments, less urgent bulk processing of the data 132 can be scheduled to occur as processing resources become available, thereby giving priority to more urgent data processing by the query generator 114, the search engine 116, the virtual applications 128, etc.

In exemplary embodiments, the application platform 110 is utilized to create and/or generate data-driven virtual applications 128 for the tenants that they support. Such virtual applications 128 may make use of interface features such as custom (or tenant-specific) screens 124, standard (or universal) screens 122 or the like. Any number of custom and/or standard objects 126 may also be available for integration into tenant-developed virtual applications 128. As used herein, "custom" should be understood as meaning that a respective object or application is tenant-specific (e.g., only available to users associated with a particular tenant in the multi-tenant system) or user-specific (e.g., only available to a particular subset of users within the multi-tenant system), whereas "standard" or "universal" applications or objects are available across multiple tenants in the multi-tenant system. For example, a virtual CRM application may utilize standard objects 126 such as "account" objects, "opportunity" objects, "contact" objects, or the like. The data 132 associated with each virtual application 128 is provided to the database 130, as appropriate, and stored until it is requested or is otherwise needed, along with the metadata 138 that describes the particular features (e.g., reports, tables, functions, objects, fields, formulas, code, etc.) of that particular virtual application 128. For example, a virtual application 128 may include a number of objects 126 accessible to a tenant, wherein for each object 126 accessible to the tenant, information pertaining to its object type along with values for various fields associated with that respective object type are maintained as metadata 138 in the database 130. In this regard, the object type defines the structure (e.g., the formatting, functions and other constructs) of each respective object 126 and the various fields associated therewith.

Still with reference to FIG. 1, the data and services provided by the server 102 can be retrieved using any sort of personal computer, mobile telephone, tablet or other network-enabled client device 140 on the network 145. In an exemplary embodiment, the client device 140 includes a display device, such as a monitor, screen, or another conventional electronic display capable of graphically presenting data and/or information retrieved from the multi-tenant database 130. Typically, the user operates a conventional browser application or other client program 142 executed by the client device 140 to contact the server 102 via the network 145 using a networking protocol, such as the hypertext transport protocol (HTTP) or the like. The user typically authenticates his or her identity to the server 102 to obtain a session identifier ("SessionID") that identifies the user in subsequent communications with the server 102. When the identified user requests access to a virtual application 128, the runtime application generator 120 suitably creates the application at run time based upon the metadata 138, as appropriate. As noted above, the virtual application 128 may contain Java, ActiveX, or other content that can be presented using conventional client software running on the client device 140; other embodiments may simply provide dynamic web or other content that can be presented and viewed by the user, as desired.

A data item, such as a knowledge article, stored by one tenant (e.g., one department in a company) may be relevant to another tenant (e.g., a different department in the same company. One way of providing a user in another tenant domain with access to the article is to store a second instance of the article in the tenant domain of the second tenant. The apparatus, systems, techniques and articles described herein provide another way of providing a user in another tenant domain with access to the article without wasting resources by storing a second copy.

Figure 2:
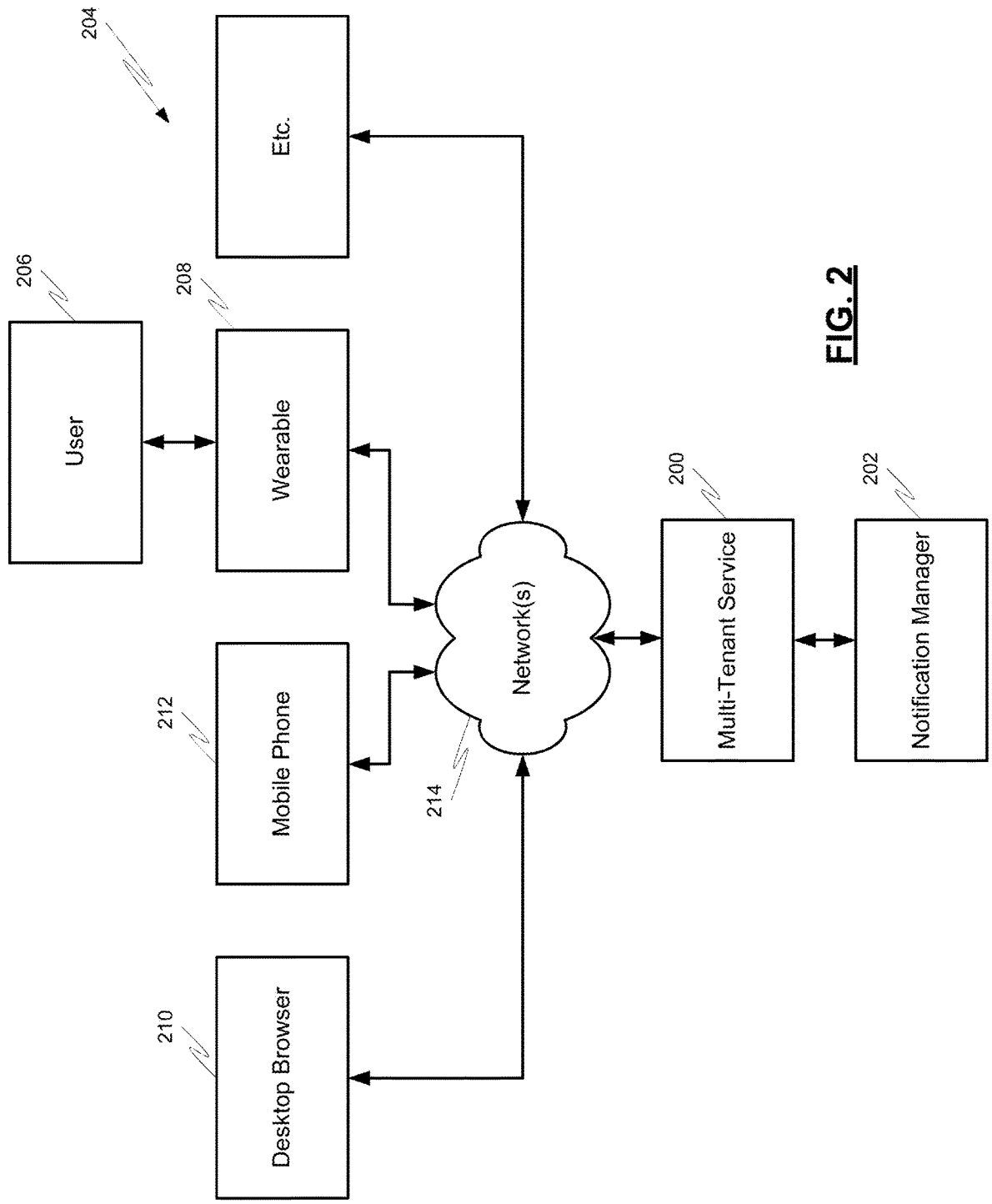
FIG. 2 is a block diagram depicting a notification manager for managing user notifications.

FIG. 2 depicts a service, such as but not limited to a multi-tenant service 200, that includes a notification manager 202 for managing the transmission of user notifications to multiple user devices 204. The notification system 200 includes a notification manager 202 that monitors events that may require a notification to be communicated to a user 206 through the user devices 204. Upon a notification event occurring, the notification manager 202 determines which of the multiple user devices 202 would be the preferred device for receiving the user notification.

For example, when an email arrives for the user 206, the notification manager 202 analyzes multiple factors for determining the preferred device to receive the user notification. This can include an assessment of which device is actively being used by the user 206. In this example, the user 206 is using a wearable device 208, such as smart glasses, when an email message arrives for the user. The notification manager 202 detects that the user's wearable device 208 is actively being used and thus is the preferred device for receiving notification of the email's arrival.

The notification manager 202 further stops the email notification from being sent to all other devices, which in this example, constitutes halting the transmission of the email notification to the user's desktop browser 210, the user's mobile phone 212, and other devices associated with the user 206. In this way, the notification manager 202 precludes a barrage of email notifications being sent to all of these different devices, thereby removing the need for the user 206 to address all of the residual notifications on the other devices at a later time.

The electronic notifications being managed by the notification manager 202 are transmitted to the preferred user device over one or more data communication network(s) 214. The data communication network(s) 214 may be any digital or other communications network capable of transmitting messages or data between devices, systems, or components. In certain embodiments, the data communication network(s) 214 includes a packet switched network that facilitates packet-based data communication, addressing, and data routing. The packet switched network could be, for example, a wide area network, the Internet, or the like. In various embodiments, the data communication network(s) 214 includes any number of public or private data connections, links or network connections supporting any number of communications protocols. The data communication network(s) 214 may include the Internet, for example, or any other network based upon TCP/IP or other conventional protocols. In various embodiments, the data communication network(s) 214 could also incorporate wireless and/or wired telephone network, such as a cellular communications network for communicating with mobile phones, personal digital assistants, and/or the like. The data communication network(s) 214 may also incorporate any sort of wireless or wired local and/or personal area networks, such as one or more IEEE 802.3, IEEE 802.16, and/or IEEE 802.11 networks, and/or networks that implement a short range (e.g., Bluetooth) protocol. For the sake of brevity, conventional techniques related to data transmission, signaling, network control, and other functional aspects of the systems (and the individual operating components of the systems) may not be described in detail herein.

Figure 3:
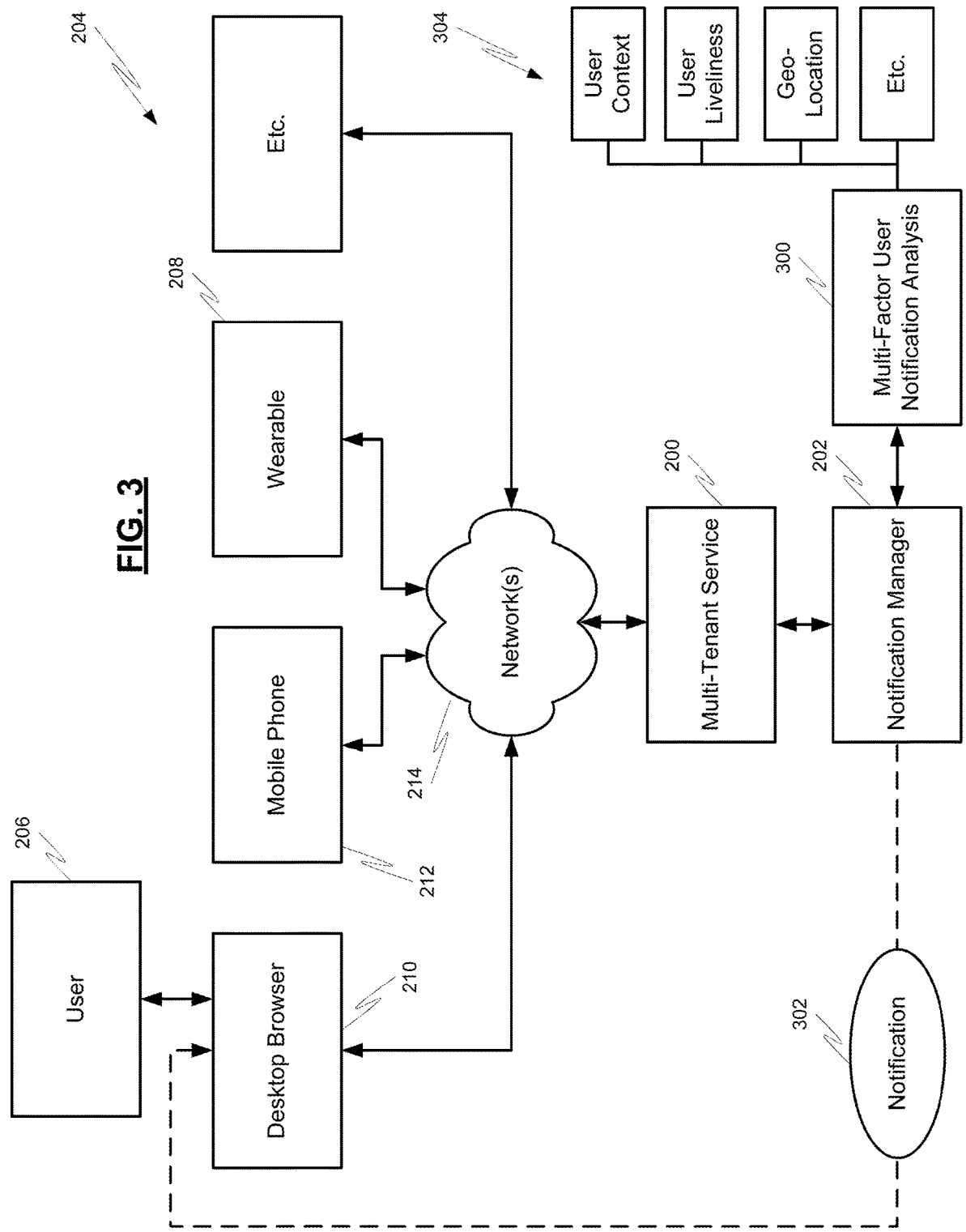
FIG. 3 is a block diagram depicting a notification manager using multiple factors for user notification transmission.

FIG. 3 depicts the notification manager 202 using multi-factor user notification analysis 300 for determining which of the user devices 204 should receive notification 302. The multi-factor user notification analysis 300 reduces the barrage of notifications by using user liveliness, context, or geo-location factors to determine the preferred notification destination.

For example, the user 206 may be working on a Gmail application on a desktop browser 210, and if the user 206 is detected as only being a few feet away from the browser's desktop, then the notification manager 202 uses these factors to determine that the notification 302 should only be sent to the desktop and should not be sent to the other devices 212 and 214. This can be useful on a very active system such as CRM software by reducing the number of user context switches. As examples of factors, geo-location can be used for tracking a user through the GPS of the user's cell phone. User liveliness can be detected based on whether a user is currently interacting with a device (e.g., keyboard utilization, mouse clicks, etc.). User context can be detected based upon which specific program or platform a user is accessing. As an illustration, a device may have programs that are unique to that device. If a program that is unique to that device is being utilized, then this user context increases the probability that the user is actively using this device.

Figure 4:
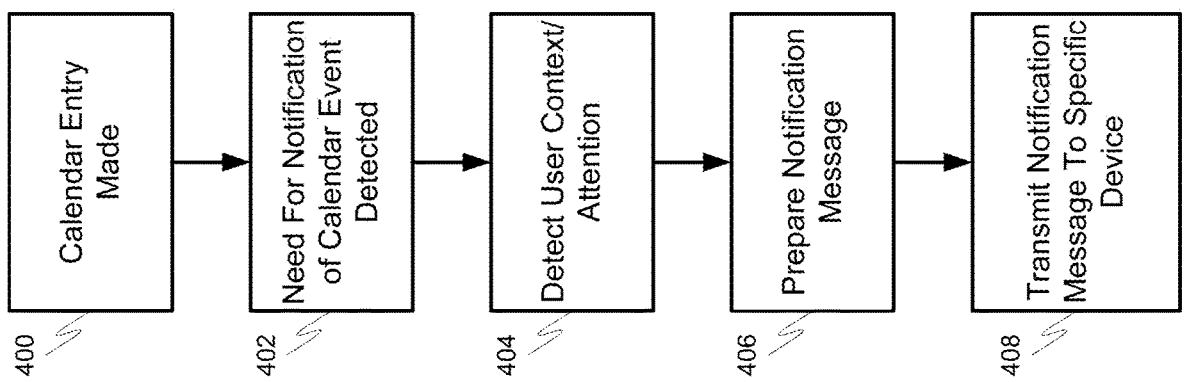
FIG. 4 is a flow chart depicting an operational scenario involving notifications being sent to a user device.

FIG. 4 illustrates that many different types of notifications can be handled by the notification manager. The operational scenario of FIG. 4 involves a corporate environment where users routinely cause events to be added to other users' calendars. Accordingly, it is not uncommon for a user to have a voluminous number of calendar events scheduled for a particular day, and in some cases, more events than a user can possibly attend. This in turn leads to a voluminous, overwhelming number of notifications that are presented to the user.

The operational scenario in this example starts at process block 400 where a calendar entry has been made for a user. At process block 402, the system detects that a notification of the calendar event needs be provided to the user. The system determines at process block 404 the preferred device for receiving the calendar event notification by examining the user context/attention factors. At process block 406, the notification message is prepared and sent at process block 408 to the one single device that has been determined to be the preferred recipient device. The system stops notification broadcasts from being sent to all other user devices.

The operations disclosed in this example will be repeated for a subsequent notification. In such a situation, the system may determine that a different device is now active and thus will start sending notifications to that device while stopping transmission of the user notifications to all of the other user devices.

Figure 5:
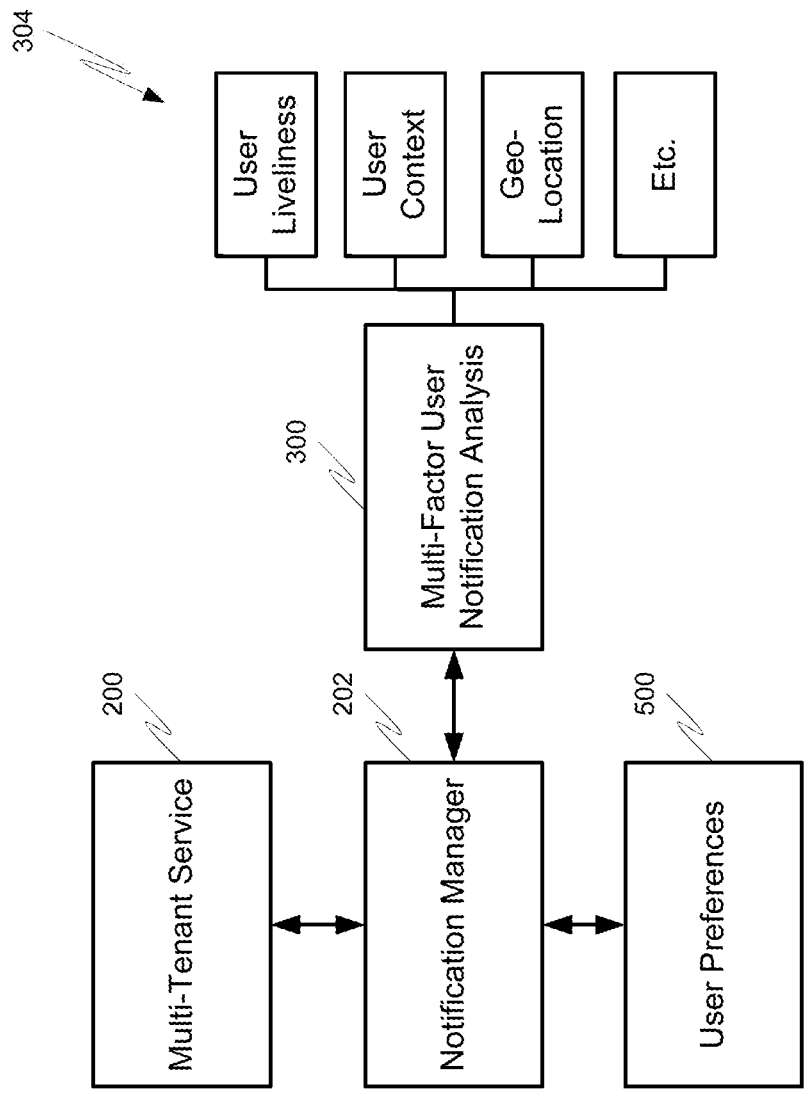
FIG. 5 is a block diagram depicting user preferences for notification processing.

FIG. 5 depicts that the notification manager 202 can include user preferences 500 for customizing notifications within the multi-factor user notification processing 300. User preferences 500 tailor notification analysis and delivery to user devices, such as by utilizing user-defined rules. User-defined rules determine the circumstances under which the notification manager stops notifications from being delivered to all devices other than the preferred device.

For example, the notification stopping mechanism may be overridden for notifications that are designated as high priority. Other rules could include a particular user wanting to receive notifications on all devices for only certain events. For example, a corporate employee might wish to receive notifications on all devices for meetings with potential sales leads and to receive notifications only on the one active device for internal meetings. In another case, an employee might wish to receive notifications on all devices for a meeting for which an invitation has been sent from his or her supervisor or for messages involving his or her chatter support group.

In one embodiment, the user notification preferences can be persisted or stored on a remote system (e.g. a remote database on the cloud). In other embodiments, they are persisted locally, for example, in an XML file or a local database on the user's desktop or other user device. In some embodiments, the remote preferences can be used to synchronize with a user's device upon the launching of an application with the associated notifications.

To detect such events, the notification manager 202 can be configured with an event listener module. An event listener module may for example listen for events that require a notification. This may include an event such as the user receiving an email message. Alternatively, it may include listening for certain API calls specific to the notification manager 202.

Other types of information can also be stored, such as information about each user device. User device information can include device type information for determining which display settings and functionality reside on a device, such as whether it has GPS capability for geo-location operations to provide a location of the device.

Figure 6:
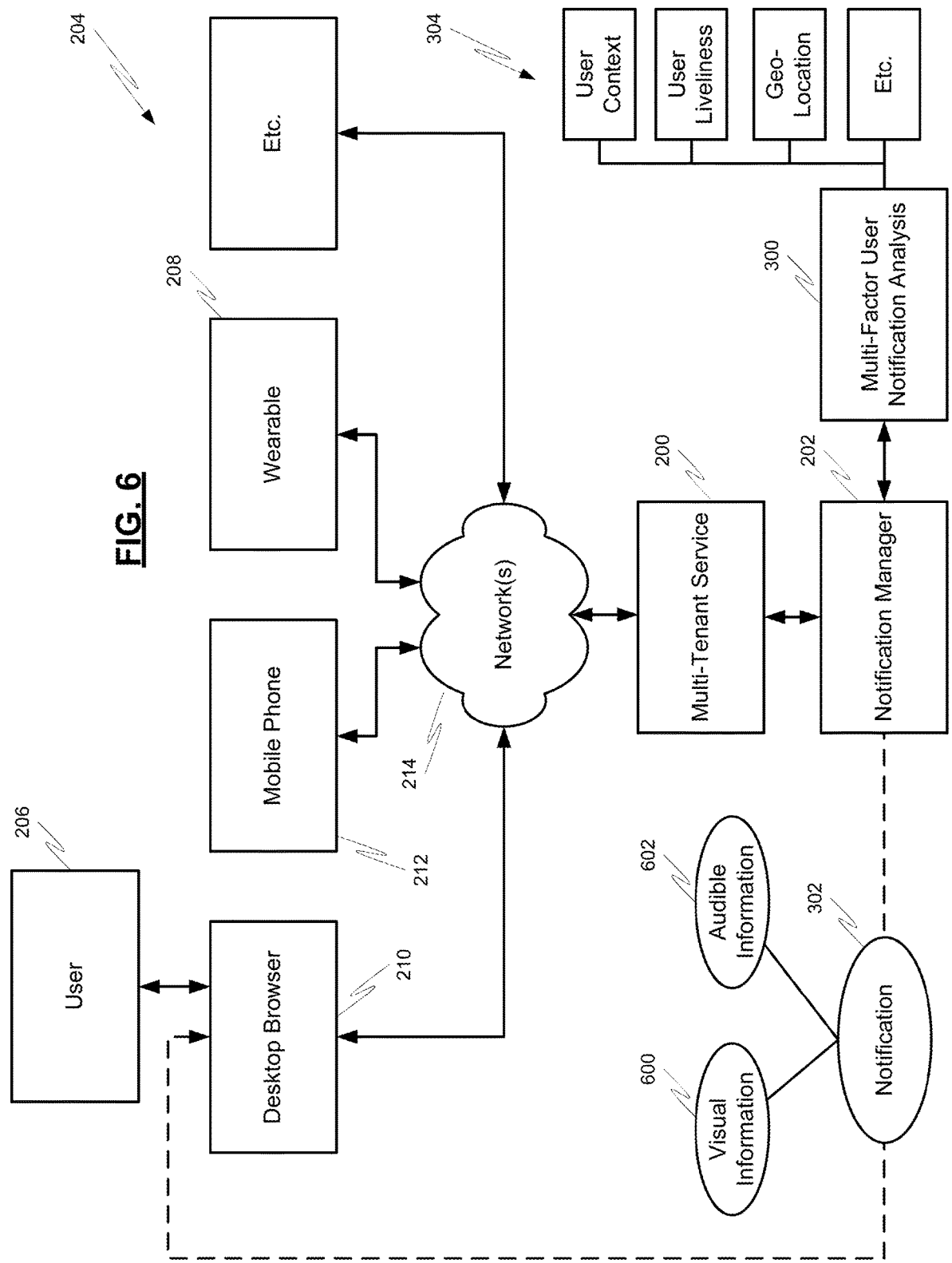
FIG. 6 is a block diagram depicting different types of user notifications.

FIG. 6 depicts that notifications can contain many different types of information. For example, notification 302 can include visual information 600 such as textual information, information conveyed through images, etc. Notification 302 could also include other types, such as audible information 602 (e.g., an alert sound, a voiced message, etc.).

Notifications are generally displayed on a device, such as a pop up on a mobile phone or as a sound that announces the arrival of a notification. They can be interactive, allowing a user to respond back to the application from which it originated, often acting on the information that the alert or notification provided.

FIG. 7 illustrates that there may be many different sources of notification events. For example, a push notification provider 700 may provide an on-demand multi-tenant database that users access with the vast majority of communications relating to the on-demand multi-tenant database system. The push notifications may relate to events within the on-demand multi-tenant database system that require the attention of the user. The push notifications are sent in relation to the multi-tenant database system and are typically notifications sent using push technology. For example, the push notifications may be alerts sent to users regarding usage limits limiting usage of the multi-tenant database that the user is approaching.

In an embodiment involving a banking application, a user might receive a push notification when a monthly account statement is ready. A receiver of the push may need to sign up for, or subscribe to, a particular service at the sender's system. Then when information is available related to that service, the sender sends the content, without waiting for the receiver to request the information. A push notification may be an alert or any notification sent at the initiation of the sender. A push notification may be sent via a push service provider according to a particular protocol and/or message format.

The foregoing description is merely illustrative in nature and is not intended to limit the embodiments of the subject matter or the application and uses of such embodiments. Furthermore, there is no intention to be bound by any expressed or implied theory presented in the technical field, background, or the detailed description. As used herein, the word "exemplary" means "serving as an example, instance, or illustration." Any implementation described herein as exemplary is not necessarily to be construed as preferred or advantageous over other implementations, and the exemplary embodiments described herein are not intended to limit the scope or applicability of the subject matter in any way.

For the sake of brevity, conventional techniques related to object models, web pages, multi-tenancy, cloud computing, on-demand applications, and other functional aspects of the systems (and the individual operating components of the systems) may not be described in detail herein. In addition, those skilled in the art will appreciate that embodiments may be practiced in conjunction with any number of system and/or network architectures, data transmission protocols, and device configurations, and that the system described herein is merely one suitable example. Furthermore, certain terminology may be used herein for the purpose of reference only, and thus is not intended to be limiting. For example, the terms "first," "second" and other such numerical terms do not imply a sequence or order unless clearly indicated by the context.

Embodiments of the subject matter may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. In practice, one or more processing systems or devices can carry out the described operations, tasks, and functions by manipulating electrical signals representing data bits at accessible memory locations, as well as other processing of signals. The memory locations where data bits are maintained are physical locations that have particular electrical, magnetic, optical, or organic properties corresponding to the data bits. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices. When implemented in software or firmware, various elements of the systems described herein are essentially the code segments or instructions that perform the various tasks. The program or code segments can be stored in a processor-readable medium or transmitted by a computer data signal embodied in a carrier wave over a transmission medium or communication path. The "processor-readable medium" or "machine-readable medium" may include any non-transitory medium that can store or transfer information. Examples of the processor-readable medium include an electronic circuit, a semiconductor memory device, a ROM, a flash memory, an erasable ROM (EROM), a floppy diskette, a CD-ROM, an optical disk, a hard disk, a fiber optic medium, a radio frequency (RF) link, or the like. The computer data signal may include any signal that can propagate over a transmission medium such as electronic network channels, optical fibers, air, electromagnetic paths, or RF links. The code segments may be downloaded via computer networks such as the Internet, an intranet, a LAN, or the like. In this regard, the subject matter described herein can be implemented in the context of any computer-implemented system and/or in connection with two or more separate and distinct computer-implemented systems that cooperate and communicate with one another. In one or more exemplary embodiments, the subject matter described herein is implemented in conjunction with a virtual customer relationship management (CRM) application in a multi-tenant environment.

While at least one exemplary embodiment has been presented, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application. Accordingly, details of the exemplary embodiments or other limitations described above should not be read into the claims absent a clear intention to the contrary.

What is claimed:

1. A method for managing displays of user notifications to a user device, comprising:
   determining an event has occurred that requires a user notification;
   receiving information about characteristics, including notification priority, app used, user activity, and where a user is located associated with the user device;
   determining a multi-factor assessment of the user device that is based upon the received notification priority, app used, user activity, and where a user is located associated with the user device;
   wherein detection of the user device having apps that are unique to the user device is used within the determining of the multi-factor assessment to halt displaying the user notification on the user device; and
   displaying the user notification on the user device based upon the determined multi-factor assessment.

2. The method of claim 1 further comprising:
   stopping transmission of the user notification to all other of user devices associated with the user except the user device that has been indicated to receive the user notification based upon the determined multi-factor assessment.

3. The method of claim 1 further comprising:
   determining that a different event has occurred that requires a user notification;
   generating the multi-factor assessment of the user device based upon the notification priority, app used, user activity, and where a user is located associated with the user device;
   using the generated multi-factor assessment to determine that a different user device is to display the user notification; and
   transmitting the user notification only to the different user device.

4. The method of claim 3 further comprising:
   stopping transmission of the user notification to all of the user devices except the different device that has been determined to be in active use.

5. The method of claim 1 further comprising:
   determining that the event is an arriving email message, a message within a chatter support group, or a calendar event.

6. The method of claim 1 further comprising:
generating the multi-factor assessment of the user device based upon proximity of a user to the user device using user context that involves type of platform that is being accessed.

7. The method of claim 1 further comprising:
receiving a user's interaction with the displayed user notification.

8. The method of claim 1 further comprising:
transmitting the user notification over one or more networks to the user device.

9. The method of claim 1 further comprising:
transmitting the user notification for display of textual information or for generation of an audible sound on the user device.

10. The method of claim 1, the user device includes one of mobile phones, tablet devices, desktop computers, wearables, television devices, and gaming consoles.

11. A system comprising a hardware processor and non-transient computer readable media coupled to the processor for managing displays of user notifications to a user device, the non-transient computer readable media comprising instructions configurable to be executed by the processor to:
determine an event has occurred that requires a user notification;
receive information about characteristics, including notification priority, app used, user activity, and where a user is located associated with the user device;
determine a multi-factor assessment of the user device that is based upon the received notification priority, app used, user activity, and where a user is located associated with the user device;
wherein detection of the user device having apps that are unique to the user device is used within the determining of the multi-factor assessment to halt displaying the user notification on the user device; and
display the user notification on the user device based upon the determined multi-factor assessment.

12. The system of claim 11, wherein transmission is stopped of the user notification to all other of the user devices except the user device that has been indicated to receive the user notification based upon the determined multi-factor assessment.

13. The system of claim 11, wherein a determination is performed that a different event has occurred that requires a user notification;
the multi-factor assessment of the user device being generated based upon the notification priority, app used, user activity, and where a user is located associated with the user device;
the generated multi-factor assessment being used to determine that a different user device is to display the user notification; and
the user notification being transmitted only to the different user device.

14. The system of claim 13, wherein transmission of the user notification is stopped for all of the user devices except the different device that has been determined to be in active use.

15. The system of claim 11, wherein the event is an arriving email message, a message within a chatter support group, or a calendar event.

16. The system of claim 11, wherein the multi-factor assessment is generated of the user device based upon proximity of a user to the user device using user context that involves type of platform that is being accessed.

17. The system of claim 11, wherein a user's interaction with the displayed user notification is received.

18. The system of claim 11, wherein the user notification is transmitted over one or more networks to the user device.

19. The system of claim 11, wherein the user notification is transmitted for display or generation of an audible sound on the user device, the user device comprising one or mobile phones, tablet devices, desktop computers, wearables, television devices, and gaming consoles.

20. A non-transient computer readable storage media comprising computer instructions configurable to be executed by a hardware processor to cause a database system to implement a method comprising:
determining an event has occurred that requires a user notification;
receiving information about characteristics, including notification priority, app used, user activity, and where a user is located associated with the user device;
determining a multi-factor assessment of the user device that is based upon the received notification priority, app used, user activity, and where a user is located associated with the user device;
wherein detection of the user device having apps that are unique to the user device is used within the determining of the multi-factor assessment to halt displaying the user notification on the user device; and
displaying the user notification on the user device based upon the determined multi-factor assessment.

* * * * *